United States Patent [19]

Peterson et al.

[11] 3,833,326
[45] Sept. 3, 1974

[54] POST-FORMING APPARATUS

[75] Inventors: Lawrence W. Peterson, Marine-on-the-St. Croix; Thomas J. Gallo, St. Paul; Kenneth L. Peterson, Bayport; Donald L. Garofalo, St. Paul, all of Minn.

[73] Assignee: Andersen Corporation, Bayport, Minn.

[22] Filed: May 9, 1973

[21] Appl. No.: 358,721

[52] U.S. Cl............... 425/174.4, 264/249, 425/384, 425/517
[51] Int. Cl............................................ B29c 24/00
[58] Field of Search.......... 425/174, 174.4, DIG. 48, 425/517, 518, 383, 384, DIG. 58, DIG. 41, 394, 397; 264/248, 249; 156/211, 212, 213, 214; 264/268

[56] References Cited
UNITED STATES PATENTS

| | | | |
|---|---|---|---|
| 2,867,864 | 1/1959 | Githens | 156/211 UX |
| 2,878,524 | 3/1959 | Fink | 264/248 X |
| 3,000,428 | 9/1961 | Hansen et al. | 425/394 X |
| 3,420,927 | 1/1969 | Corrinet | 264/268 X |
| 3,776,803 | 12/1973 | Kissell | 425/174 X |

Primary Examiner—R. Spencer Annear
Assistant Examiner—Mark Rosenbaum

[57] ABSTRACT

Apparatus which is useful to post-form marginal tabs of a decorative plastic shroud to embrace a supporting frame in the manufacturing of plastic shutters, panels, and the like. The apparatus comprises a first station which includes heating means which are mounted on a base (e.g., a table) to concentrate heat along one or more longitudinally extended focal lines. Means are provided for positioning the plastic shroud relative to the heating means. The apparatus further comprises a second station which includes means for post-forming the heated marginal tabs of the plastic shroud to embrace the supporting frame.

9 Claims, 8 Drawing Figures

POST-FORMING APPARATUS

BACKGROUND OF THE INVENTION

In recent years, various companies have manufactured plastic shutters as a substitute or alternate for wooden shutters. Properly constructed, plastic shutters have numerous advantages including the general lack of maintenance required. Plastic shutters can be manufactured by a variety of techniques. For example, solid core plastic shutters can simply be molded from suitable plastics. Some plastic shutters, because of their design, can be manufactured with a hollow core defined by rather thin exterior plastic walls. Also, plastics can be used to coat shutter-like wood cores. Other plastic shutters can be made by forming a thin sheet of rigid plastic material into a generally rectangular pan-shaped shroud which is self-supporting or which is attached to a supporting frame (e.g., a wooden or plastic frame) by means of adhesives, fasteners, or the like.

In the latter type of construction, it is common to bond the supporting frame to the plastic shroud, usually by extensive use of an adhesive which bonds the entire frame to the shroud with adhesive being applied completely around the entire outer rim of the supporting frame. Although one might assume that a firm bond between the entire frame and the shroud is desirable, creating a firm bond between the entire frame and shroud actually results in certain disadvantages. One disadvantage of substantially completely bonding the entire supporting frame to the shroud is that the rates of expansion and contraction of the frame and shroud are not identical. As a consequence, shutters of this type have a tendency to become distorted after a period of time, particularly in the colder climates. This detracts from the appearance of the shutters as well as often resulting in damage to the shutters.

In a U.S. Pat. application entitled "A Process For Manufacturing Plastic Shutters and the Like," filed Jan. 30, 1973, Ser. No. 328,067 commonly owned with the instant application, a shutter construction is described in which a decorative plastic shroud has peripheral edge members or marginal tabs which are post-formed to embrace a supporting frame without completely bonding the shroud to the entire frame by means of adhesives. Since the entire supporting frame is not completely bonded to the plastic shroud, the shroud and the frame can separately expand or contract without materially warping or distorting the shroud.

SUMMARY OF THE INVENTION

The present invention is directed to apparatus constructed to post-form plastic shrouds in the manufacture of shutters and the like. This type of shutter construction is described in U.S. Pat. application Ser. No. 328,067, filed Jan. 30, 1973. The present post-forming apparatus is relatively simple in construction, inexpensive to manufacture and extremely durable in use. It requires a minimum of skill to use and is substantially fool-proof in operation. It requires a minimum of maintenance and is adaptable to post-forming plastic shutters and the like of varying dimensions. Certain embodiments of the apparatus lend themselves to high speed production.

The present apparatus includes a base (e.g., a table) having a surface for supporting articles (e.g., shutters) being processed in the apparatus. The apparatus is provided with at least one heating station and at least one forming station, both positioned relative to the article supporting surface. In use, a pre-formed, generally pan-shaped plastic shroud and its supporting frame are subjected to the sequential action of these two stations either by moving the shroud and its frame from the heating station to the forming station, or by moving the forming station into position relative the plastic shroud after a portion of the plastic shroud has been heated by the heating elements.

At the heating station, a plurality of heating elements are carried by the base and concentrate heat on marginal tabs of a plastic shroud along a longitudinally extended focal line. Means are provided to properly position the plastic shroud with respect to the heating elements. At the second or forming station, means are provided to post-form the heated marginal tabs of the plastic shroud into an embracing relationship with the supporting frame. Desirably, this post-forming results in overbending of the marginal tabs (i.e., a bend greater than 90°) since plastics used to form the shrouds (e.g., vinyl) tends to relax or "un-bend" slightly when cooled after post-forming.

THE DRAWINGS

In the Drawings, like numerals indicate like parts throughout the views.

DETAILED DESCRIPTION OF A PREFERRED EMBODIMENT

Figure 1:
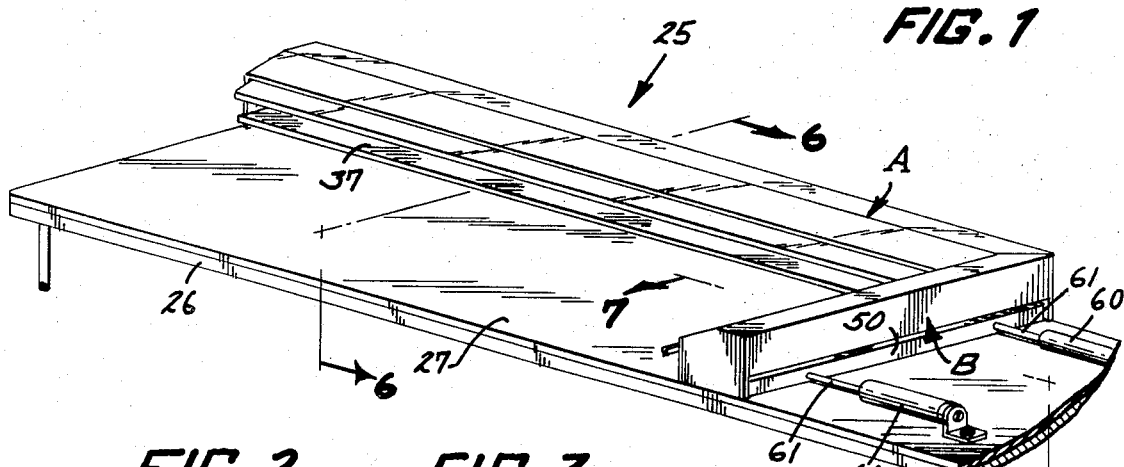
FIG. 1 is a perspective view of post-forming apparatus constructed in accordance with the present invention.

The present apparatus can be readily understood if one first refers to the plastic shutters which are partially fabricated by use of the present post-forming apparatus.

FIGS. 2-5 illustrate a decorative plastic shutter, indicated generally by the reference numeral 10. Shutter 10 is constructed in accordance with the process described in co-pending U.S. Pat. application Ser. No. 328,067 filed Jan. 30, 1973. Briefly described, shutter 10 is formed from a generally pan-shaped plastic shroud 11 having a decorative front face 12 and angularly disposed peripherally extending edge members (hereinafter referred to as upturned sides or sidewalls) 13, 14, 15 and 16. The plastic shroud 11 is formed from a sheet of plastic material (e.g., a thermoplastic such as polyvinyl chloride) by vacuum forming in a female mold (not shown) to form the generally rectangular pan-shaped plastic shroud 11 shown in FIGS. 2, 3, 4 and 5. The shutter 10 is further provided with a generally rectangularly shaped supporting frame, indicated generally by the numeral 19 in FIGS. 3–5, which frame is positioned within the confines of plastic shroud 11 adjacent to the upturned sides 13–16, and in further contact with the back surface of the decorative front panel 12. The vacuum forming process used in making plastic shroud 11 inherently creates an outwardly turned flange (not shown) on the upturned sides 13–16 which is partially trimmed away to leave a short outwardly turned lip portion 20. Prior to post-forming sides 13–16, the upturned sides 13–16 of the shroud 11 are notched at the corners thereof, as indicated at 21 in FIG. 5, to aid in the subsequent post-forming operation. These notches 21 create foldable marginal tabs from the upper portions of upturned sides 13-16 of plastic shroud 11. Desirably, frame 19 is formed with a peripheral channel or groove 22. Once the frame 19 has been placed within plastic shroud 11 and the outwardly turned flange from vacuum forming removed from shroud 11 to produce lip 20, and the corners of shroud 11 are notched, the shutter 10 is ready for processing in the post-forming apparatus of the present invention.

Figure 6:
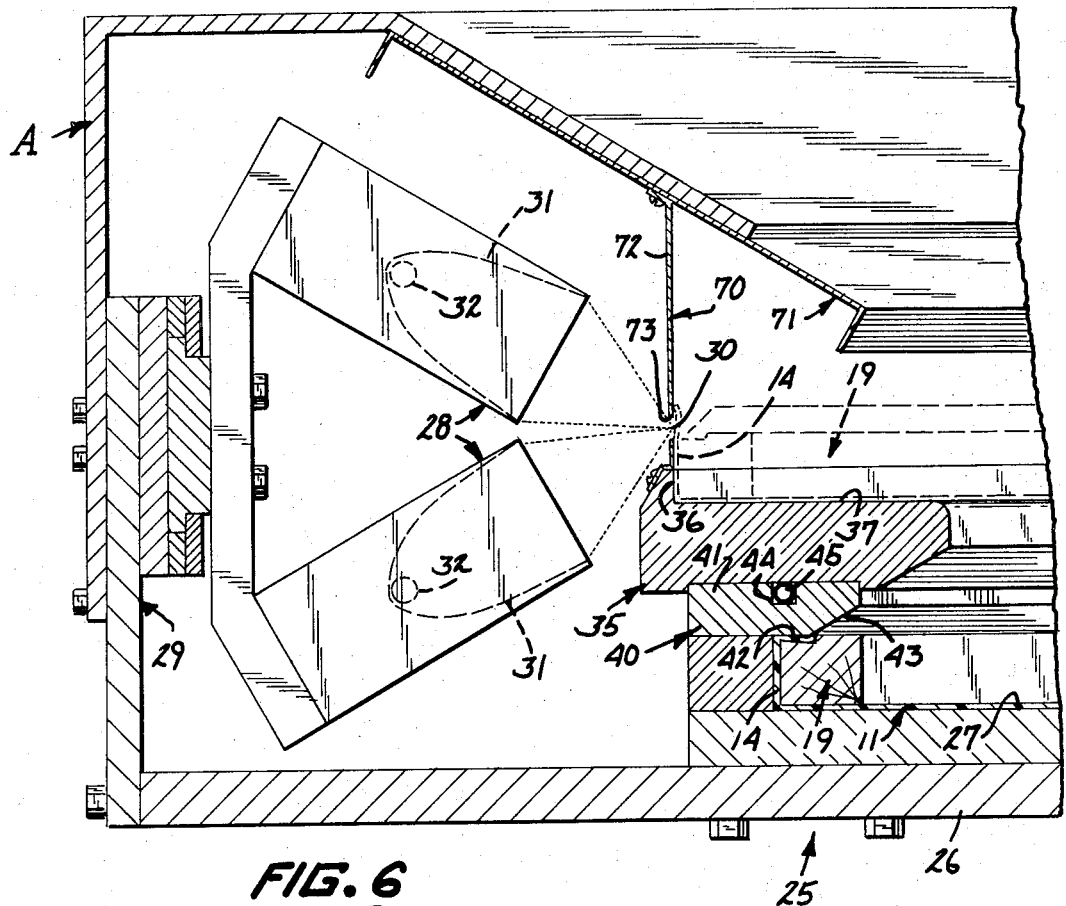
FIG. 6 is an enlarged vertical section of the postforming apparatus as seen generally from the line 6—6 of FIG. 1 in the direction of the arrows.
Figure 7:
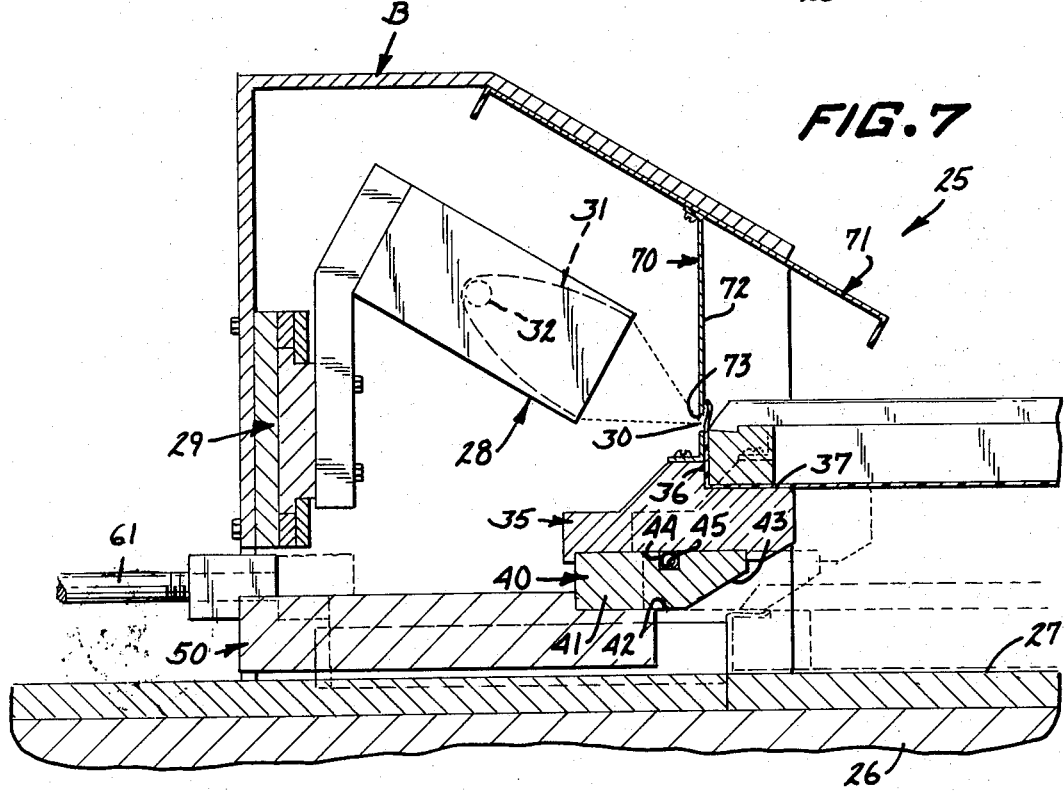
FIG. 7 is an enlarged vertical section of the postforming apparatus as seen generally from the line 7—7 of FIG. 1 in the direction of the arrows.

FIGS. 1, 6 and 7 illustrate one form of post-forming apparatus, identified generally by the reference numeral 25 which is capable of post-forming the marginal tab portions of the upturned sides 13–16 of plastic shroud 11 into an embracing relationship with the supporting frame 19. In this way, the shroud 11 can be attached to and supported on the frame 19 without the need for fasteners or adhesives, although such can be used if desired.

As shown, particularly in FIGS. 1, 6 and 7, the post-forming apparatus 25 includes a base 26 having a generally horizontal shutter-supporting surface 27. Desirably, the base 26 is in the form of a work table. Preferably, the table top will be made of stainless steel. As shown in FIG. 1, the post-forming apparatus 25 includes two arms, generally designated by the letters A and B. However, the apparatus can be made to function in post-forming shutters or the like with only one arm or with more than two arms (e.g., 3 or 4 arms). Ordinarily, the arms are arranged at right angles to each other. As shown, each arm (A and B) includes two stations, the details of which are more clearly shown in FIGS. 6 and 7.

The first station includes heating means in the nature of a plurality of angularly extending heating elements 28 which are mounted relative to base 26, by brackets 29, to concentrate heat along a horizontally extending focal line indicated at 30. The use of a pair of generally parallel, angularly displaced heating elements 28 having a common focal line 30 (as shown in FIG. 6) is preferred since this tends to quickly produce high temperatures along the upturned sides 13–16 of plastic shroud 11, thereby reducing the time of processing a shutter 10. Focal line 30 is spaced above and extends generally parallel to the supporting surface 27. Preferred heating elements 28 are high intensity infrared line heaters such as those manufactured by Research Inc., Box 24064, Minneapolis, Minnesota 55424. Each of the line heaters or heating elements 28 generally includes an elongated elliptic reflector 31 and a heating element in the nature of a quartz lamp 32 positioned relative to the elliptic reflector to concentrate heat along the focal line 30. The quartz lamp 32 extends substantially the length of its respective reflector 31 so as to concentrate heat evenly along the entire length of focal line 30. If desired, a series of smaller heating elements can be connected in tandem (i.e., end on end). In this first station, marginal tabs of the plastic shutter shroud are heated along the focal line 30 (described above). As shown in the drawings, an un-formed shutter is positioned at the heating station by use of register means or bench 35 which includes both a stop member or shoulder 36 and an article supporting surface 37. When a plastic shroud 11 is placed on supporting surface 37 it is then pushed against shoulder 36 which properly positions the plastic shroud 11 with respect to the heating elements 28 to thereby position the line of bending of marginal tabs 13–16 (as appropriate) at or near focal line 30. That is, the shroud 11 is positioned so that focal line 30 extends along a mid portion of the upturned sides 13–16 (as appropriate). It will be appreciated that the thickness dimension of the supporting frame 19 will determine the level at which the article supporting surface 37 should be positioned relative to focal line 30.

For the purpose of forming or bending the heated marginal tab portions of the upturned sides 13–16 into embracing relationship with the frame 19, a second station is provided in each arm of post-forming apparatus 25. This second station includes forming means 40 that includes a camming element 41 having a horizontally disposed surface portion 42 (which extends parallel to and is spaced from the article supporting surface 27) and an upwardly and inwardly inclined surface portion 43. Forming means 40 tends to become quite hot when the apparatus 25 is in use and improved results can be obtained if forming means 40 is cooled. As shown in FIGS. 6 and 7, this can be accomplished by providing a channel 44 in the forming means 40 and then placing a copper tube 45 in the channel 44 to permit circulation on demand of cold water through the apparatus. This reduces the surface temperature of the forming means 40 and allows shorter cycle times to be used.

Although it is possible to construct post-forming apparatus wherein the heating station and forming station are positioned to operatively heat and form only one marginal tab of the shroud 11 at a time, FIG. 1 illustrates a post-forming apparatus 25 in which two pairs of heating and forming stations are positioned in the L-shaped configuration wherein the long arm of the L is indicated at A and the short arm of the L is indicated at B. With this construction, relatively higher rates of production may be maintained with a minimum of effort and time since two sides of a shutter assembly can be post-formed at one time. With further modifications, 3 or 4 sides of the shutter can be post-formed simultaneously. However, as will later be described with reference to FIG. 8, a "U" shaped configuration has some substantial advantages over many other arrangements.

As shown in FIGS. 6 and 7, arm A with its associated heating and forming stations is rigidly mounted with respect to the base 26, while the forming station associated with arm B of FIG. 1 is mounted for reciprocal movement in a transverse direction. Movement of the forming station of arm B can be accomplished by mounting the forming station of arm B on a carriage element 50 which in turn is mounted for reciprocatory movement on base 26, such movement being controlled by the operator who selectively actuates pressure operated cylinders 60 and rams 61. The cylinders 60 are mounted rigidly to the base 26 while one end of each ram 51 is secured to moveable carriage 50.

As seen in FIGS. 6 and 7, the register means 35 associated with arms A and B are each mounted in a vertically stacked relationship with respect to their respective forming units or cams 40. In this manner, the post-forming apparatus 25 requires but a minimum of space and efficiently utilizes an operator's time and effort.

For the purpose of eliminating stray rays of light from heating means 28 as well as preventing an operator from being burned by the heating elements 28, shields 70 and 71 can be used, each of which extends the length of each of the L-shaped arms of the post-forming apparatus 25. The shields 70 each include a vertical wall portion 72 disposed at the focal line 30. A narrow longitudinally extended slot or window 73 is formed in shield 70 at or near focal line 30. Consequently, each of the heating elements 28 can concentrate its heat through slot 73 onto a marginal tab of plastic shroud 11.

Figure 8:
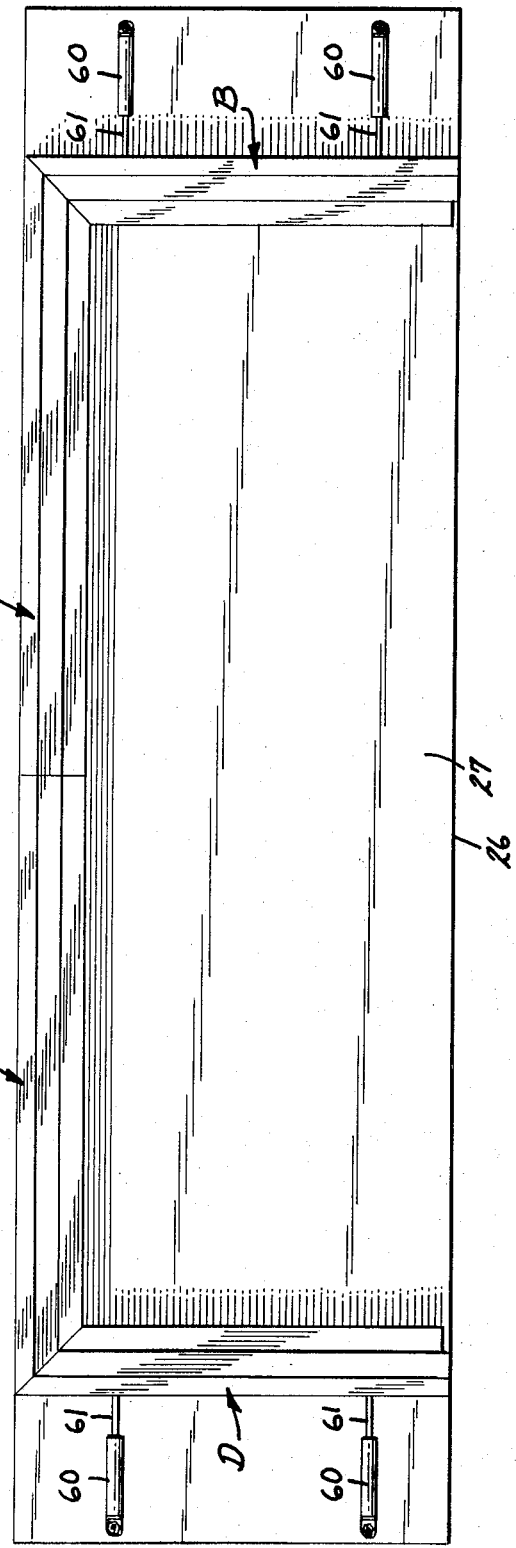
FIG. 8 is a top plan view of a modified form of the post-forming apparatus of FIG. 1.

A particularly preferred embodiment of post-forming apparatus is shown in FIG. 8. In this arrangement, the apparatus includes a table 27 on which are mounted two fixed arms, C and A, which are connected in tandem and which are capable of both independent and coordinated operation by means of controls (not shown). Also mounted on table 27 are two reciprocatory arms D and B which are also capable of both independent and coordinated operation. In this configuration (referred to herein as a "split-U" configuration), two operators can simultaneously use the apparatus to post-form shutters, one operator using arms D and C and their independent controls, and a second operator using arms A and B and their independent controls. However, whenever it is desired to make larger shutters than can be accommodated by arms D and C only, or arms A and B only, one operator can do so merely by selectively operating arms A and B together in conjunction with either or both of arms B and D.

DESCRIPTION OF THE OPERATION

Figures 2, 3:
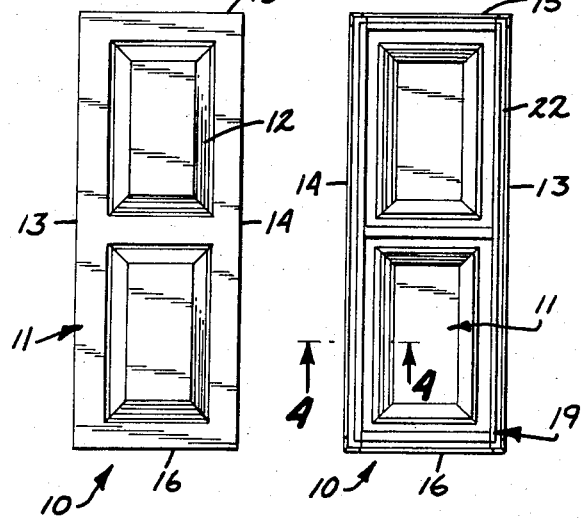
FIG. 2 is a front elevational view of a decorative plastic shutter which can be processed on the apparatus of FIG. 1.
FIG. 3 is a rear elevational view of the shutter of FIG. 2.
Figure 4:
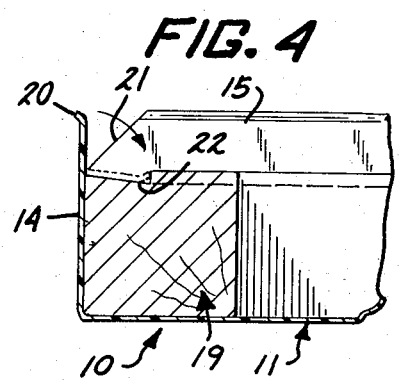
FIG. 4 is an enlarged fragmentary sectional view of the shutter of FIG. 3 as seen generally from the line 4—4 of FIG. 3, in the direction of the arrows.
Figure 5:
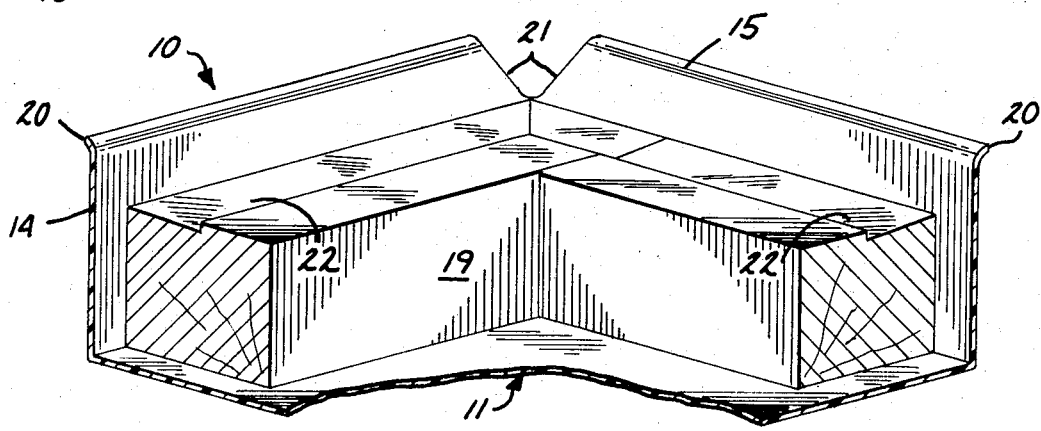
FIG. 5 is an enlarged fragmentary view in perspective of a portion of the shutter of FIGS. 2, 3 and 4 prior to forming the marginal tab portions of the sidewalls of the plastic shroud into embracing relationship with the supporting frame.

To use the above-described post-forming apparatus 25 to form the completed shutter 10 as illustrated in FIGS. 2 and 3 of the drawings, an operator first positions a supporting frame 19 within the plastic shroud 11 as illustrated in FIGS. 3, 4 and 5 of the drawings. The thickness of the particular supporting frame 19 which is used determines the depth of the notch 21 which is formed at each corner of the plastic shroud 11. The marginal tabs (previously referred to) are those portions of sidewalls 13–16 which are above the supporting frame 19 and bounded on the ends by notch 21, all as shown in FIG. 5. The thickness of the supporting frame 19 also determines the location of supporting surface 37 relative to focal line 30 and determines the location of forming element 40 relative to the supporting surface 27.

An operator, not shown, moves the shutter 10 to the heating station by placing the plastic shroud 11 (with its supporting frame 19) on article supporting surface 37 and slides the shroud rearwardly and to the right (as shown in FIG. 1) until the upturned sides 14 and 15 are in engagement with stop members 36 of both arms A and B. This positions the base of the two marginal tabs 14 and 15 at focal line 30 of arms A and B respectively. Thereafter, heating elements 28 of arms A and B are energized for a predetermined time period to concentrate heat through slot 73 along the focal line 30, thereby softening the plastic material of the shroud 11 sufficiently to allow post-forming. When the predetermined heating period has elapsed, the operator withdraws the shutter 10 from the the heating station and lowers it to the forming station where the outer surface 12 of the shroud 11 is in contact with article supporting surface 27. The shutter 10 is moved to the right as shown in FIG. 1 until heated upturned sidewall 15 contacts stop member 46 associated with forming unit 40 of leg B. It will be noted, by reference to FIG. 7, that camming element 41 of arm B is in a retracted position and does not initially engage the marginal tab of the heated upturned sidewall 15. Thereafter, the operator moves the shutter 10 rearwardly into arm A of post-forming apparatus 25 to cause the marginal tab of heated sidewall 14 to contact inclined surface portion 43 of camming element 41 of arm A. Rearward movement of the shutter 10 is continued until the upturned sidewall 14 engages stop member 44 of leg A. As a result, the marginal tab portion of upturned sidewall 14 is folded, usually about 15° past a 90° bend, to cause the marginal tab to be received within the channel 22.

As noted, channel 22 is formed so that slight overbending of the marginal tab portion of the upturned sidewall 14 is permitted. This overbending occurs due to engagement of the lip 20 with surface 42 of camming element 41 as the upturned side 14 moves into engagement with the stop member 44 of leg A. When the shutter 10 has been moved to the position wherein it engages stop members 44 of both legs A and B, the operator selectively actuates rams 61 to move the forming unit 40 of leg B from the retracted full line position of FIG. 7 to the dotted line position thereof. This causes the marginal tab portion of upturned sidewall 15 to be bent into an adjacent portion of channel 22 in a manner similar to that of upturned sidewall 14. Cooling water is then circulated through tubes 45 and this forming position is maintained until sufficient cooling of the heated sidewalls has occured so that the marginal tab portions of the upturned sidewalls 14 and 15 will substantially retain their formed or bent position when the forming pressure is released. When sufficient cooling has occurred, rams 61 are deactivated to move the forming unit 40 of leg B to its retracted position and the shutter 10 is withdrawn from the stationary forming member 40 of leg A. At this time the shutter 10 is rotated 180° on a vertical axis so as to permit the marginal tab portions of upturned sidewalls 13 and 16 to be heated and formed as previously described with respect to upturned sidewalls 14 and 15.

When the marginal tab portions of all of the upturned sidewalls 13–16 have been bent or formed into adjacent portions of the channel 22, the shutter 10 may be mounted on a wall or next to a window by screws or the like with the supporting frame 19 in direct contact with the wall. Since the plastic shroud 11 is mounted on the supporting frame 19 without the need for adhesives, relative movement can occur between the plastic shroud 11 and the supporting frame 19 during contraction-expansion periods caused by varying conditions of heat and cold. This reduces the problem of distortion.

What is claimed is:

1. Post-forming apparatus for bending a marginal tab portion of an angularly disposed sidewall of a plastic shroud to embrace a supporting frame, said apparatus comprising:
   a. a base that includes a supporting surface for said plastic shroud;
   b. at least one heating station carried by said base, said heating station including:
      1. means for concentrating heat from a heat source along a longitudinally extending focal line, said focal line being spaced from and extending generally parallel to said supporting surface; and
      2. means for positioning the base of said marginal tab generally at said focal line;
   c. at least one forming station carried by said base, said station spaced from said supporting surface, including means for bending the heated marginal tab.

2. Apparatus of claim 1 which includes at least two pairs of heating and forming stations, one of said pairs being arranged generally perpendicular to another of said pairs, with all of said heating stations lying in a common plane and all of said forming means lying in a common plane.

3. Apparatus of claim 2 in which each of said heating stations includes:
   a. an elliptic reflector;
   b. at least one heating element extending substantially the length of said reflector, said heating element being positioned relative to said reflector to concentrate heat at said focal line; and
   c. means for mounting said reflector and heating element on said base.

4. Apparatus of claim 3 in which said heating element is a quartz lamp.

5. Apparatus of claim 4 in which said means for bending the marginal tabs includes a camming element having:
   a. a horizontally disposed surface portion extending parallel to and spaced from said supporting surface; and
   b. an upwardly and inwardly inclined surface portion diverging from said article supporting surface.

6. Apparatus of claim 5 having two pairs of heating and forming stations, said pairs being arranged in an L-shaped configuration wherein the means for bending the marginal tab along one leg of said L-shaped configuration is stationary and wherein the means for forming the marginal tab along the other leg in said L-shaped configuration is mounted for reciprocatory movement.

7. Apparatus of claim 6 in which a shield extends the length of said heating element and generally through said focal line, said shield having a longitudinally extending slot formed therein to permit concentrated heat to pass through said slot and impinge upon a properly positioned plastic shroud.

8. Apparatus of claim 5 in which means are provided for selectively cooling said forming means.

9. Apparatus of claim 8 in which at least four pairs of heating and forming stations are arranged in a split-U configuration on a common work table, at least two of said pairs being oriented in tandem and rigidly mounted to said table, and at least two pairs of said stations being mounted parallel to each other and generally perpendicular to the tandem pairs, the forming elements of said parallel pairs being mounted for reciprocatory movement.

* * * * *